United States Patent [19]

Harding

[11] 4,311,254

[45] Jan. 19, 1982

[54] FOAM DISPENSING GUN

[75] Inventor: Gary Harding, Thonotosassa, Fla.

[73] Assignee: Universal Foam Systems, Inc., New Berlin, Wis.

[21] Appl. No.: 159,461

[22] Filed: Jun. 16, 1980

[51] Int. Cl.³ .............................................. B05B 7/12
[52] U.S. Cl. .................................... 222/145; 251/241
[58] Field of Search .............. 222/145, 473, 134, 485, 222/488, 136, 137; 251/241, 323

[56] References Cited

U.S. PATENT DOCUMENTS 3,237,809  3/1966  Daragon et al. .................... 222/135
3,399,837  9/1968  Frick .
3,633,795  1/1972  Brooks .
3,784,110  1/1974  Brooks .

Primary Examiner—Stanley H. Tollberg
Attorney, Agent, or Firm—Robert F. Ziems

[57] ABSTRACT

A foam dispensing gun of the type having a disposable nozzle for mixing and dispensing separate fluid components of a resin system. The nozzle is retained on the gun by a sliding breech which also pivotally supports a valve actuating trigger to be in an operative position when the breech is moved to retain a nozzle to the gun and disabled when the breech is moved to release the nozzle for reloading.

13 Claims, 5 Drawing Figures

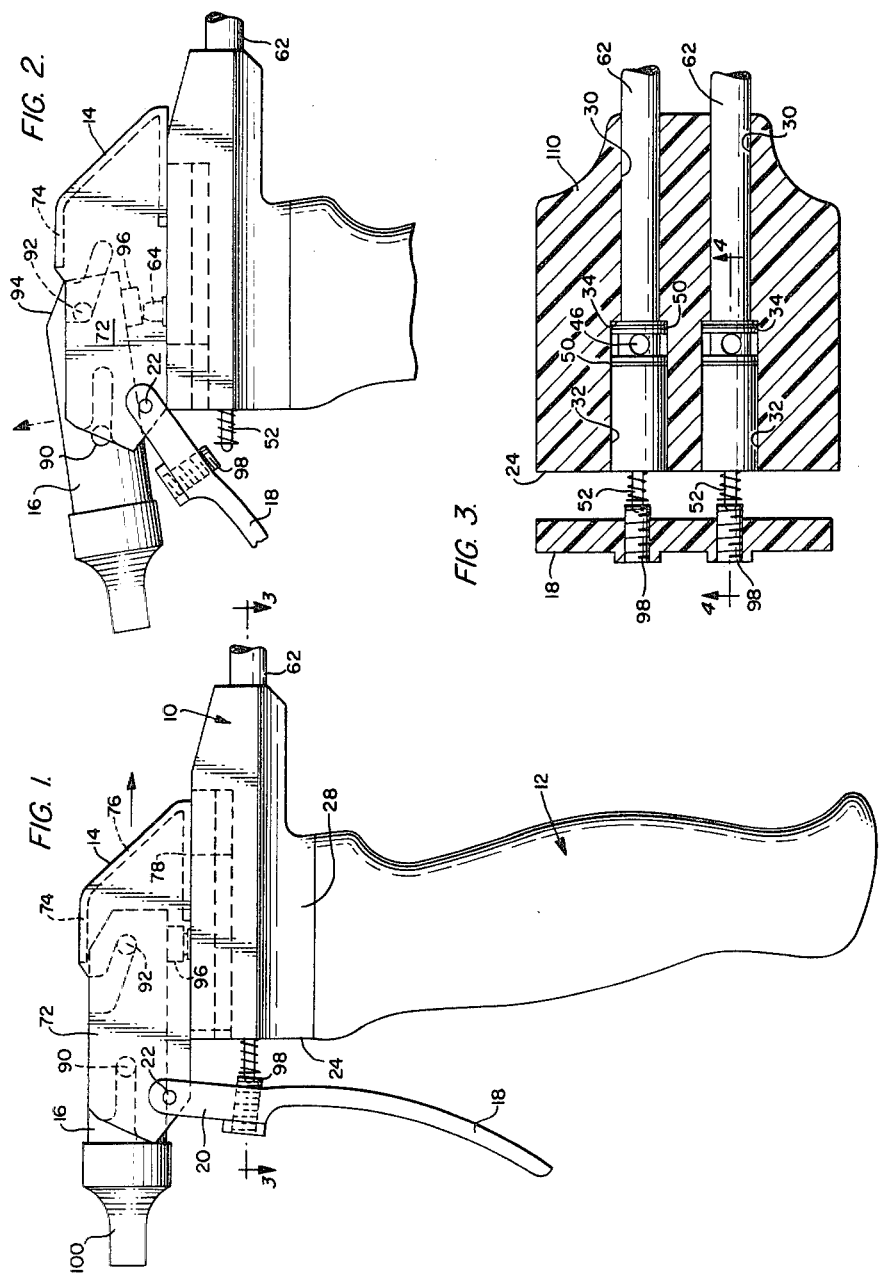

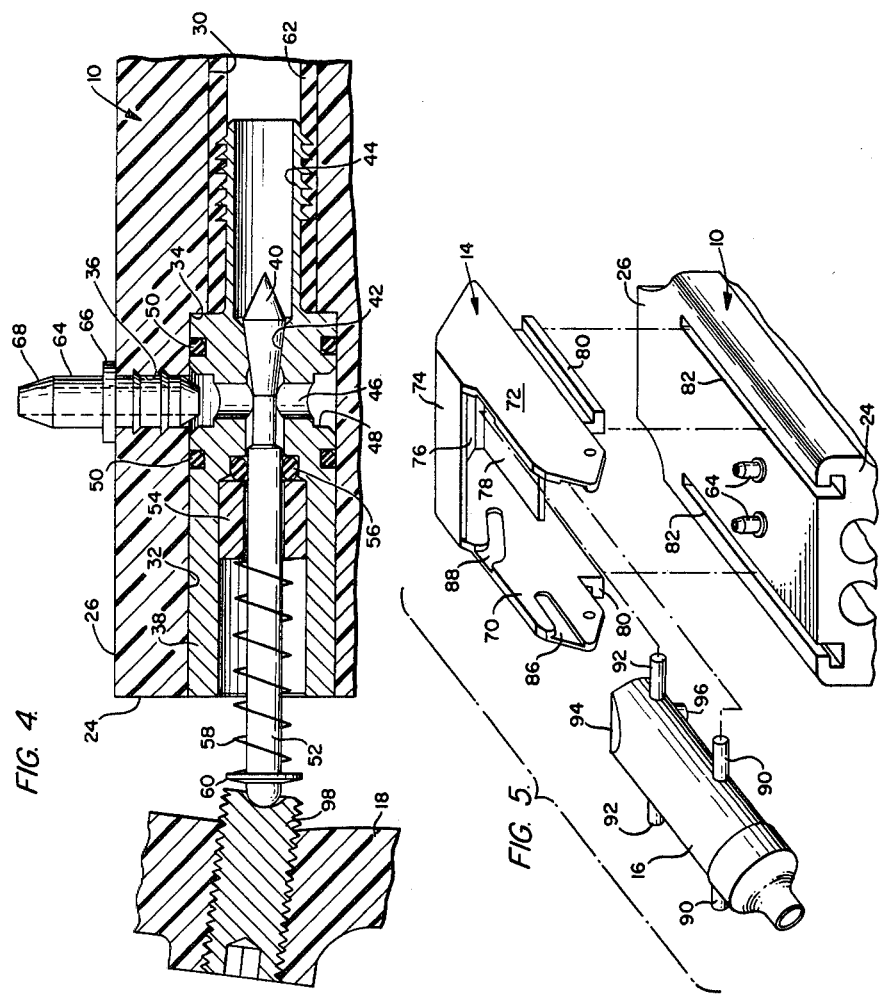

FOAM DISPENSING GUN

BACKGROUND OF THE INVENTION

This invention relates to apparatus for mixing and dispensing multi-component fluids and more particularly, it concerns foam dispensing guns adapted to be used with resin systems in which two or more fluid components, separately stored in pressurized vessels, are mixed and dispensed as a settable foam.

U.S. Pat. No. 3,399,837, issued Sept. 3, 1968 to C. E. Frick, U.S. Pat. No. 3,633,795 and U.S. Pat No. 3,784,110, the latter two having been issued respectively on Jan. 11, 1972 and Jan. 8, 1974 to William R. Brooks, disclose dispensing guns for urethane foam and the like in which separate fluid components are fed individually to the gun, passed separately through controlled valve ports and brought into contact with each other only upon reaching a mixing chamber of a nozzle from which the mixed components are discharged as foam. In each instance, the nozzle of the gun is designed to be disposable in order to avoid the necessity for cleaning any part of the gun which comes into contact with mixed as distinguished from separate foam producing fluid components. As a result, the initial fluent characteristics of the foam producing components may be maintained without wastage even though use of the gun may be interrupted for time intervals of sufficient duration for the mixture to set in and plug the nozzle. In other words, the gun is restored to a ready-to-use condition simply by replacing a nozzle plugged by solidified or set foam.

The fluid components of the foam producing resin system used with dispensing guns exemplified by the disclosures of the aforementioned patents, are fed to the gun under pressures up to 250 psi. Because of the pressure drop at the gun nozzle, the rate of fluid component flow is easily controlled by a relatively simple trigger actuated valve arrangement. Back pressure exerted on the nozzle in use, however, requires that the replaceable nozzle be retained on the gun body with sufficient holding force to handle the pressures involved without accidental dislodgement of the nozzle from the gun. In the past, the provision of a suitably strong nozzle mount has involved compromise with avoidance of complex, expensive or cumbersome gun structure.

An additional and particularly acute problem is presented in the design of such foaming guns due to the potential for accidental discharge of the fluid components when the nozzle is not in place on the gun. During the replacement of a nozzle, for example, accidental operation of the trigger-controlled valve on the gun could result in a sudden release of both fluid components under the pressures mentioned. The occurrence of such accidental discharge presents not only a safety hazard to the operator of the gun but also a source of potential damage to previously dispensed foam and the working environment in general. While safety devices have been proposed, they have generally required positive action on the part of the gun operator to place the gun in a "safe" condition. Thus, failure of the operator to take such action will result in the gun being left in an unsafe condition where accidental discharge of the unmixed fluid components might occur.

SUMMARY OF THE INVENTION

In accordance with the present invention, a foam dispensing gun is provided with a disposable nozzle mounting structure and integrated valve control trigger so that retention of the nozzle against component fluid pressure is assured and so that the control trigger is automatically disabled upon removal of a nozzle from the gun. These functional attributes are achieved very simply by a breech component slidable between positions of nozzle retention and nozzle release in a direction perpendicular to the direction of fluid component flow from the body of the gun to the nozzle. The valve control trigger is supported pivotally from the breech to be in an operative relationship with gun body carried valve stems when the breech is positioned to retain a nozzle. When the breech is retracted to release the nozzle for removal, however, the trigger is pivoted to an inoperative position away from the valve stems and cannot be returned to the operative position without movement of the breech either to engage and retain a nozzle or to at least partially block the gun body ports through which the fluid components of the resin system are fed to the nozzle.

A principal object of the present invention is, therefore, the provision of an improved foam dispensing gun of the type adapted for use with disposable nozzles, which is highly effective in operation, which is capable of low-cost manufacture using a minimal number of easily formed and assembled components and which is inherently safe in use. Other objects and further scope of applicability will become apparent from the detailed description to follow taken in conjunction with the accompanying drawings in which like parts are designated by like reference numerals.

BRIEF DESCRIPTION OF THE DRAWINGS

FIG. 1 is a side elevation illustrating an assembled foam dispensing gun in accordance with the invention;

FIG. 2 is a fragmentary side elevation illustrating the gun of FIG. 1 with components positioned to receive a nozzle;

FIG. 3 is a cross-section on line 3—3 of FIG. 1;

FIG. 4 is an enlarged fragmentary cross-section on line 4—4 of FIG. 3; and

FIG. 5 is an exploded perspective view illustrating cooperating components of the foam dispensing gun.

DETAILED DESCRIPTION OF THE PREFERRED EMBODIMENT

In FIG. 1 of the drawings, an embodiment of a foam dispensing gun of the present invention is shown to include a gun body 10 and a handle 12 to which the gun body 10 is securely fixed by suitable means (not shown) such as interlocking dovetail formations, bonding, threaded fasteners or the like. The gun body 10 supports a slidable breech 14 which, in turn, supports a disposable mixing nozzle 16 and a depending trigger 18 having a yoke 20 at its upper end for pivotal attachment to the sliding breech 14 by a pin 22. Although the structure of each of the components as well as the manner in which they cooperate during operation of the gun will be described in more detail below, it will be noted here that the gun body 10, the handle 12, the sliding breech 14 and the trigger 18 are unitary components formed of suitable synthetic resinous or plastic material shaped by injection molding techniques.

The gun body 10, as shown in FIGS. 1, 2 and 5, is shaped externally to provide a front surface 24 joining at right angles with a planar top surface 26. A lower or base portion 28 is necked down to join with the top of the handle 12. Extending longitudinally through the body 10 are a pair of bores 30 and counterbores 32 the latter opening at the front face 24 and defining with the bores 30 annular ledges 34. A pair of vertical ports 36 extend between the counterbores 32 and the top surface 26 of the gun body as shown in FIG. 4.

Received within each of the counterbores 32 is a valve assembly including a generally cylindrical valve body 38 and a valve needle 40. The valve body 38 defines a rearwardly diverging tapered seat 42 against which the valve needle 40 seats to prevent passage of fluid in a direction from a barbed nipple portion 44 of the valve body through the seat 42 to radial valve discharge ports 46. The ports 46 open to a circular recess 48 defining with the counterbore 32 a discharge manifold located between a pair of O-ring seals 50 acting between the valve body 38 and the counterbore 32.

The valve needle 40 includes a stem 52 supported for axial movement in the valve body by an annular bushing 54. An O-ring seal 56 prevents passage of fluid from the region of the radial outlet ports 46 past the valve stem 52 and bushing 54. A valve seating spring 58 acts in compression between a press nut 60 at the outer end of the stem 62 and the bushing 54. Thus, in the absence of any external force, the valve needle 40 will be biased against the seat 42 or to a closed condition by the spring 58.

The barbed nipple portion 44 of each of the valve bodies 38 extends within one of two hoses 62 which connect the valve body 10 in fluid communication with separate sources of foam producing fluid components (not shown). The outside diameter of the hoses 62 is selected to fit slidably within the bores 30. The external diameter of the barbed nipple 44 is selected to fit within each of the hoses 62 and in a manner such that insertion of the valve body rearwardly of the gun body will result in the ends of the hoses 62 being seized between the barbed nipple portion 44 of the valve body 38 and the bores 30.

Press fit within each of the ports 36 is a nozzle coupling nipple 64. Each of the nipples 64 is provided with a stop flange 66 to limit the extent to which the coupling nipples may be depressed within the ports 36. Also, the projecting or top end of the nipple 64 is provided with a tapered seat 68.

The breech 14, as indicated, is a one piece plastic molding shaped to establish a pair of laterally spaced vertical wall portions 70 and 72 joined by transverse top, rear and bottom wall formations 74, 76 and 78, respectively, (FIGS. 1 and 5). These latter transverse walls extend from the rear of the breech 14 only partially along its length thus permitting the substantial forward portions of the walls 70 and 72 to project in open spaced relationship. At the bottom of each of the sidewalls 70 and 72 is an L-shaped rail 80 adapted to be received in one of a pair of complementing undercut or L-shaped grooves 82 formed in the top surface 26 of the gun body 10 as shown in FIG. 5. To facilitate assembly of the breech 14 with the body 10, the grooves 82 are open through the front surface 24 of the gun body 10 as shown in FIG. 5. After the rails 80 of the breech 14 are slid rearwardly into the slots 82, the coupling nipples 64 are inserted into the ports 36. As may be seen in FIGS. 1, 2 and 5, the inserted nipples project past the bottom wall formation 78 to provide a front stop for limiting forward sliding movement of the breech relative to the gun body significantly beyond the position illustrated in FIG. 1 of the drawings. Rearward movement of the breech is restricted by the rear end of the L-shaped rails 80 striking the back of the slots 82 to achieve the position illustrated in FIG. 2 of the drawings.

Each of the sidewall portions 70 and 72 of the breech 14 are provided with front and rear cam slots 86 and 88, respectively. As shown in FIGS. 1, 2, and 5, the slots 86 and 88 are spaced to receive respective fore and aft lugs 90 and 92 projecting laterally from the nozzle 16.

The nozzle 16, as shown most clearly in FIG. 5 of the drawings, is a generally cylindrical member from which the lugs 90 and 92 project diametrically. A chamfer 94 is formed at the top rear edge of the body of the nozzle and also a pair of nozzle inlet port nipples 96 (FIGS. 1, 2 and 5) project downwardly substantially in the plane of the rear lugs 92 in a manner to register with the coupling nipples 64 projecting upwardly from the top surface 26 of the gun body 10.

To assemble or load the nozzle 16 into an operative position, the breech 14 is slid rearwardly to a nozzle release position as shown in FIG. 2 of the drawings. In this position, the nozzle may be dropped downwardly so that the lugs 90 enter the forward opening of the cam slots 86 whereas the lugs 92 drop into the upper opening of the rear cam slots 88. A slight forward movement of the breech from the position shown in FIG. 2 will result in the inlet port nipples 96 on the nozzle 16 registering with and engaging the coupling nipples 64 sufficiently at least to prevent further forward movement of the nozzle 16. Upon continued movement of the breech 14 from the position shown in FIG. 2 to a nozzle retention position as shown in FIG. 1, the forward lugs 90 on the nozzle will undergo relative sliding movement in the cam slots 86 without substantial vertical variation. Because of the inclination of the rear cam slots 88 in the breech, however, the rear lugs 92 will be cammed downwardly so that the inlet nipples 96 on the nozzle move into a fluid tight engagement with the coupling nipples 64. To remove a nozzle 16 from the gun the procedure is merely reversed.

With reference again to FIGS. 1 and 2 of the drawings, it will be noted that the trigger 18 carries suitable valve stem engaging means such as a pair of set screws 98 in a position to engage the ends of the valve stems 52 when the breech 14 is positioned to retain a nozzle 16 or in the position illustrated in FIG. 1. In this condition it will be appreciated that one grasping the handle 12 and squeezing the trigger 18 will cause the valve stems to move the valve needles 40 from the valve seats 42. Fluid components under pressure and supplied through the hoses 62 will pass simultaneously through the respective valve outlet ports 46, through the coupling nipples 64 and into the nozzle 16 where the fluid components are mixed and discharged as foam through a discharge orifice 100 on the nozzle 16. Also, it will be appreciated that by varying the extent to which the trigger 18 is moved in this manner, the rate of foam discharge from the nozzle orifice 100 may be regulated.

When the breech 14 is moved to its rear position for the release or replacement of a nozzle 16, however, the trigger pivot pin 22 will be carried with the breech and the trigger will be pivoted by engagement with the front surface 24 of the gun body to an inoperative position illustrated in FIG. 2. Moreover, any attempt to move the trigger 18 to a fluid discharging condition will result in forward movement of the breech.

In light of the pivotal support of the trigger 18 from the breech 14, a substantial measure of inherent safety is provided in the foam dispensing gun of the invention.

Because of the need for mixing the two fluid components of the resin system, these separate components are supplied under high pressure to the gun body 10 by way of the hoses 62. With a nozzle 16 in place, foam may be discharged with relative ease and accuracy of control through the nozzle orifice 100. If the needle valves 40 are opened while no nozzle 16 is in place, however, the fluid components will issue in high velocity streams through the open coupling nipples 64 thus representing a hazard both to the operator of the gun and to the work area in which the gun is being used. It is therefore important that the trigger 18 be disabled during nozzle replacement in the manner described above.

A further measure of safety is provided by the breech 14 in the event it is moved to the forward position of FIG. 1 without placement of a nozzle 16. In particular, the top and rear walls 74 and 76 on the breech serve to prevent accidental discharge of unmixed fluid components directly from the coupling nipples 64. As may be seen in FIG. 1, the top wall 74 becomes located above the nipples 64 when the breech is moved to the forward position. Hence, if the trigger was accidentally pulled without a nozzle 16 in place, the fluids issuing from the nipples 64 would strike the top wall 74 and be directed by the top wall and rear wall 76 forwardly away from the operator.

Thus it will be appreciated that as a result of the present invention, a highly effective foam dispensing gun is provided. It is contemplated and believed to be apparent to those skilled in the art from the preceding description that modifications and/or changes may be made in the disclosed embodiment without departure from the present invention. Accordingly, it is expressly intended that the foregoing description is illustrative of a preferred embodiment only, not limiting, and that the true spirit and scope of the present invention be determined by reference to the appended claims.

I claim:

1. In a foam dispensing gun having a gun body with at least one passageway adapted to be connected to a pressurized supply of a fluid component, valve means for controlling the flow of fluid through said passageway and means for releasably retaining a disposable nozzle in fluid communication with said passageway downstream from said valve means, the improvement wherein said nozzle retaining means comprises:
   fixed means on said gun body to engage and prevent movement of a disposable nozzle on one of two mutually perpendicular directional axes;
   a breech slidable on said body between first and second positions in a direction parallel to said one directional axis; and
   means on said breech to engage and support a disposable nozzle when said breech is in said first position.

2. The apparatus recited in claim 1, including trigger means for actuating said valve means, said trigger means being supported by said breech to be operative when said breech is in said first position and inoperative when said breech is in said second position.

3. In a foam dispensing gun having a gun body defining a top surface and provided with at least two passageways each adapted to be connected to a separate pressurized supply of a fluid component, valve means for controlling the flow of fluid through said passageways and means for releasably retaining a disposable nozzle in fluid communication with said passageways downstream from said valve means, the improvement wherein said nozzle retaining means comprises:
   a breech slidable between first and second positions in a direction perpendicular to the direction of fluid flow from said passageways; and
   means on said breech to engage and support a disposable nozzle when said breech is in said first position;
   each of said passageways opening through a coupling nipple projecting from said top surface to engage a complementing inlet nipple on the disposable nozzle and to restrict movement of the nozzle in a direction parallel to said top surface and to the direction of sliding movement of said breech between said first and second positions.

4. The apparatus recited in claim 3, wherein said means on said breech to engage and support a disposable nozzle includes front and rear pairs of mutually facing cam slots to engage complementing lugs on the disposable nozzle.

5. The apparatus recited in claim 4, wherein said rear cam slots are positioned substantially at the location of said coupling nipples and inclined to move the rear end of the nozzle toward said coupling nipples upon movement of said breech from said second position to said first position.

6. The apparatus recited in claim 3, wherein said gun body is formed having a pair of undercut parallel slots in said top surface, said breech having a pair of complementing rails retained slidably in said undercut slots.

7. The apparatus recited in claim 3, wherein said breech comprises a pair of laterally spaced vertical wall portions joined by transverse top and rear wall formations extending from the rear of the breech only partially along its length so that substantial forward portions of the vertical wall portions project in open spaced relationship, said top and rear transverse wall formations extending to be positioned over said coupling nipples when said breech is in said first position.

8. A foam dispensing gun adapted to be connected to separate pressurized fluid components to be mixed and dispensed from the gun, said gun comprising:
   a gun body having a pair of fluid passageways adapted to be connected to the respective pressurized fluid components, a pair of coupling nipples defining outlets for said passageways and valve means for controlling flow of the fluid components through said passageways to said outlet nipples;
   a disposable cylindrical nozzle member having fore and aft lugs thereon projecting in a common diametric plane and a pair of inlet nipples projecting in a plane perpendicular to the plane of said lugs;
   a breech supported by said body for sliding movement between first and second positions in a direction perpendicular to the direction of fluid flow from said coupling nipples, said breech having front and rear cam formations to engage said fore and aft lugs, respectively on said nozzle member; and
   trigger means pivotally supported from said breech to be in operative position for control of said valve means when said breech is in said first position and to be disabled for valve actuation when said breech is moved to said second position.

9. The apparatus recited in claim 8, wherein the plane of said inlet nipples include said aft lugs, said rear cam formations having an opening positioned in the plane of said coupling nipples when said breech is in said second position and being inclined to move said aft lugs and said inlet nipples into engagement with said coupling nipples upon movement of said breech from said second to said first position.

10. The apparatus recited in claim 8, wherein said breech includes transverse wall formations positioned to overlie said coupling nipples when said breech is in said first position.

11. The apparatus recited in claim 8, wherein said gun body comprises a top surface having undercut slots formed therein to receive complementing depending rails on said breech and a front surface perpendicular to said top surface, said valve means including actuating stem means projecting from said front surface, said trigger means depending from said breech when in said first position to be pivotal into engagement with said stem means.

12. The apparatus recited in claim 11, wherein movement of said breech to said second position causes said trigger means to pivot by engagement with said front surface out of contact with said valve stem means.

13. The apparatus recited in claim 1, wherein said fixed means comprises at least one coupling nipple projecting from the gun body and in fluid communication with said passageway.

* * * * *